United States Patent
Kotani

(10) Patent No.: US 6,839,308 B2
(45) Date of Patent: Jan. 4, 2005

(54) INFORMATION DATA REPRODUCING APPARATUS

(75) Inventor: Takuya Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 10/080,673

(22) Filed: Feb. 25, 2002

(65) Prior Publication Data

US 2002/0159186 A1 Oct. 31, 2002

(30) Foreign Application Priority Data

Feb. 28, 2001 (JP) ........................................ 2001-054805

(51) Int. Cl.$^7$ .............................................. G11B 7/00
(52) U.S. Cl. .................. 369/47.32; 369/47.15; 369/47.1; 369/59.1
(58) Field of Search .................. 369/47.1, 47.11, 369/47.13, 47.15, 47.16, 47.21, 47.23, 47.24, 47.28, 47.29, 47.3, 47.32, 47.33, 47.34, 53.1, 53.31, 59.1, 59.2

(56) References Cited

U.S. PATENT DOCUMENTS 5,559,776 A * 9/1996 Ikenaga ..................... 369/47.1
5,802,018 A * 9/1998 Kim et al. ............... 369/47.54

FOREIGN PATENT DOCUMENTS

JP        7-153238        6/1995

* cited by examiner

Primary Examiner—Muhammad Edun
(74) Attorney, Agent, or Firm—Fitzpatrick, Cella, Harper & Scinto

(57) ABSTRACT

A reproducing apparatus for reproducing a plurality of information data recorded on a recording medium in accordance with reproduction control data that indicates a reproduction procedure of the plurality of information data, wherein a reproduction order designated by the reproduction control data is changed in accordance with the recording positions of the plurality of information data on the recording medium, the plurality of information data are reproduced in accordance with the changed reproduction order to be written in a memory, the plurality of information data are read out from the memory in the order designated by the reproduction control data, and the content of the reproduction control data is changed in accordance with the changed reproduction order.

22 Claims, 5 Drawing Sheets

```
<smil>
  <head>
    <layout>
       <root-layout width="640" height="480"/>
    </layout>
  </head>
  <body>
    <video src="data_a.mpg"/>
    <video src="data_b.mpg"/>
    <video src="data_c.mpg"/>
  </body>
</smil>
```

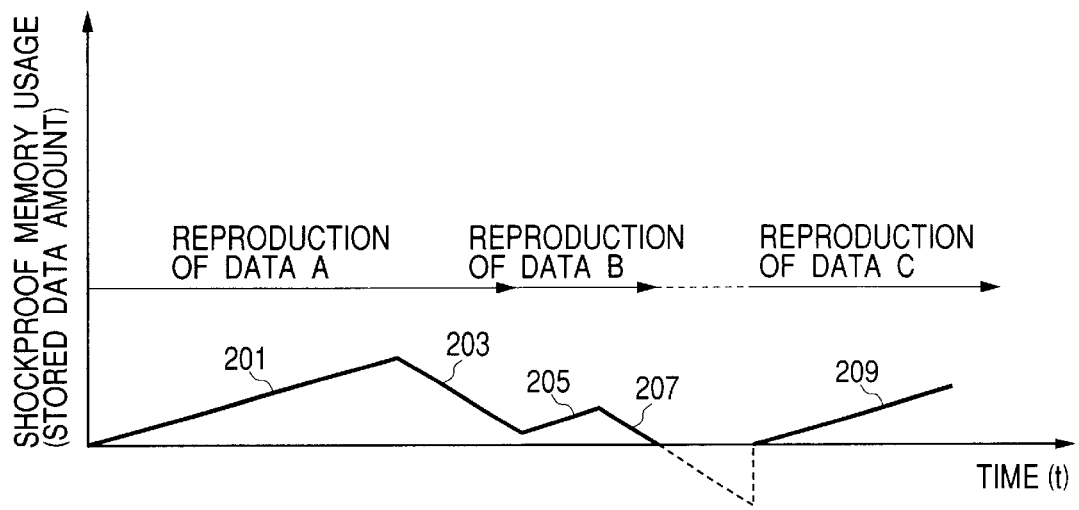
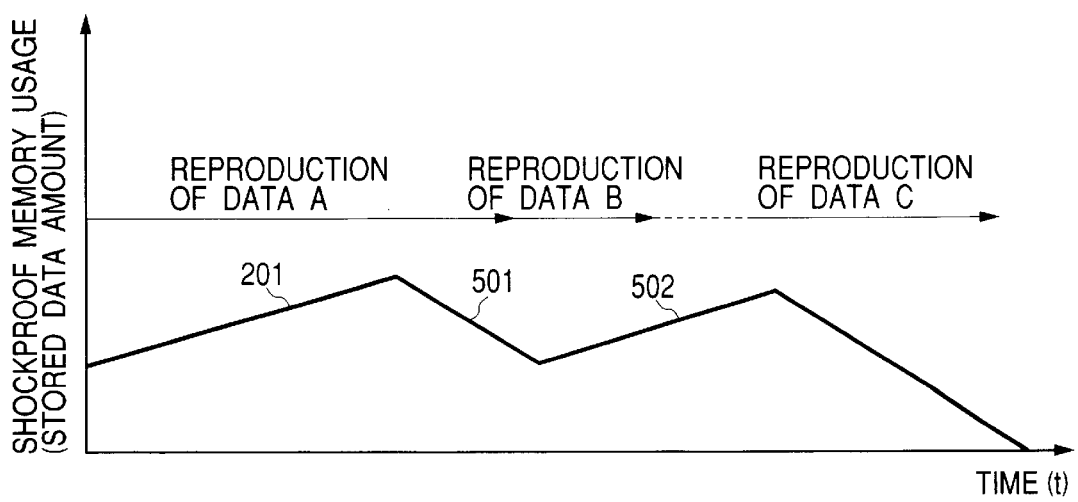

FIG. 6

```
<smil>
  <head>
    <layout>
        <root-layout width="640" height="480"/>
    </layout>
  </head>
  <body>
    <prefetch src="data_b.mpg" />
    <video src="data_a.mpg" />
    <video src="data_b.mpg" />
    <video src="data_c.mpg" />
  </body>
</smil>
```

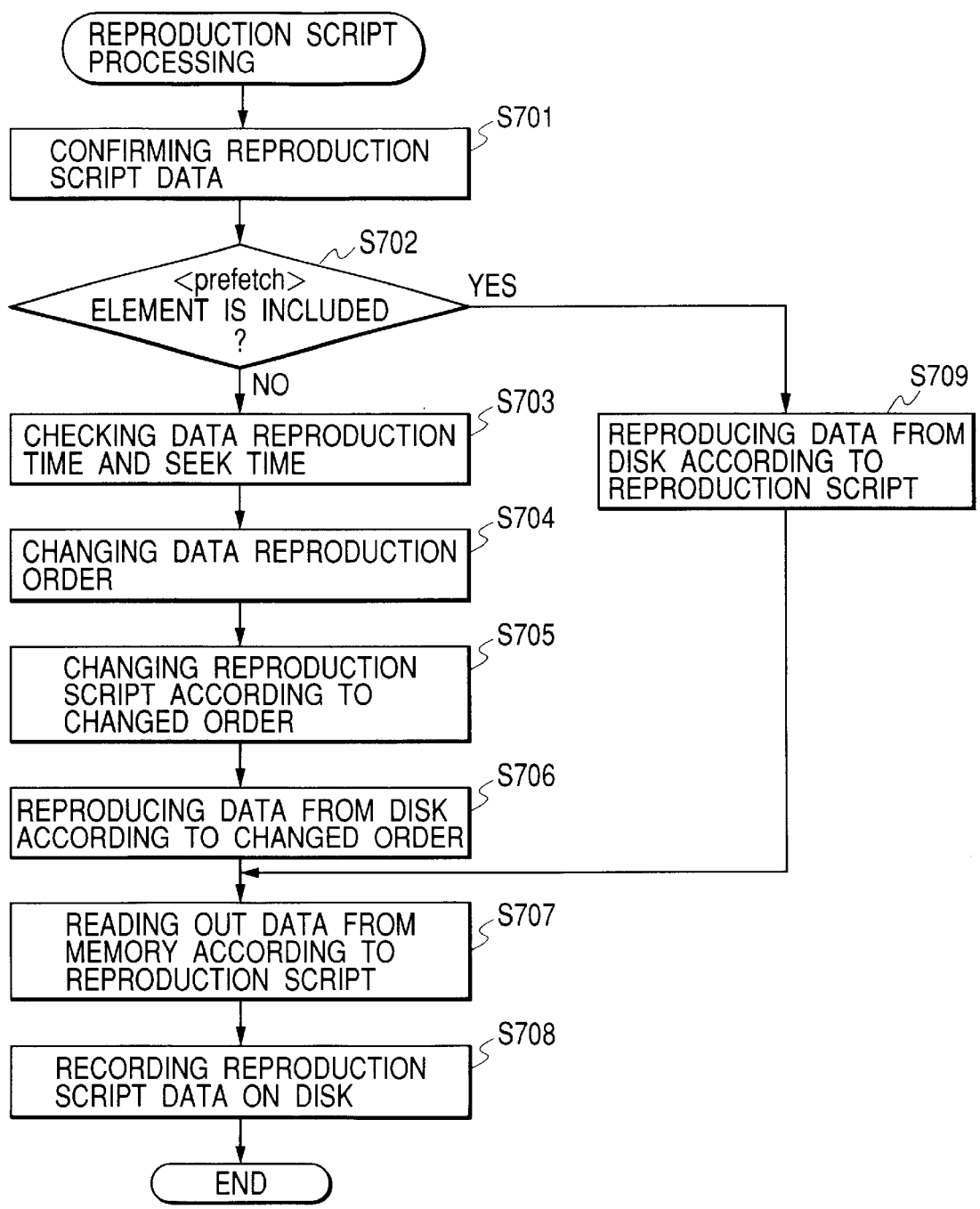

INFORMATION DATA REPRODUCING APPARATUS

BACKGROUND OF THE INVENTION

1. Field of the Invention

The present invention relates to an information data reproducing apparatus and, more particularly, to control of an information data reproduction procedure.

2. Related Background Art

In recent years, devices for recording/reproducing information data such as image data or audio data on/from a random access medium such as an MO (Magneto Optical disc) have been proposed.

In such recording/reproducing devices, generally, the data write/read rate for a recording medium is higher than the data rate of information data to be recorded. Hence, an apparatus of this type has a kind of buffer memory called a shockproof memory. Data recorded/reproduced on/from a recording medium is temporarily stored in this memory and then read out at a predetermined timing to absorb the rate difference. The shockproof memory not only absorbs the rate difference for a medium but also prevents interruption of recording/reproducing processing due to disturbance such as a vibration.

Advantages of employing such a randomly accessible recording medium are that a list of recorded data can easily be looked up, and that moving image and music data can easily be edited since recorded data are divided to a certain unit and stored as files.

However, when, e.g., an MO is used as a recording/reproducing medium, the inter-area seek time required when areas where a plurality of data are recorded are to be sequentially accessed, poses a problem depending on the characteristics of the medium. For example, in reproducing moving images A, B and C recorded in separate areas on a medium, if the reproduction time of the moving image B is excessively short, seek may delay. This problem also occurs when one moving image is divisionally recorded in a plurality of areas.

To solve this problem, the invention described in Japanese Laid-Open Patent Application No. 07-153238 employs a method of shortening the inter-area seek time by rearranging data on a recording medium in accordance with the order of reproduction. When this method is employed, divisional recording can be reliably prevented, and the seek time can be shortened.

In recent years, a reproduction description language (reproduction script) for controlling reproducing processing of thus recorded moving image data or audio data is proliferating.

An example is SMIL (Synchronized Multimedia Integration Language). The SMIL can instruct synchronous reproduction or sequential reproduction of image data such as moving images or still images, and reproducing processing of another media data such as text or audio data. It can also instruct a transition effect which is useful upon switching display of image data.

Instead of executing an editing processing directly onto recorded image data or audio data, an editing result is recorded on a recording medium as a reproduction script together with image data and audio data. With this technique, no edited data need be newly generated. In addition, a decrease in storage capacity of the recording medium can be prevented.

In such a conventional method, however, for a recording medium with a low write/read rate, a considerably long time is required to replace data. In addition, every time the user changes the data reproduction order, the positions of data recorded on the medium must be replaced, resulting in much labor.

Furthermore, when a plurality of reproduction scripts are recorded on one recording medium, it is very difficult to rearrange the data on the recording medium so as to shorten the seek time for all the reproduction scripts.

SUMMARY OF THE INVENTION

It is an object of the present invention to solve the above problems.

It is another object of the present invention to prevent any loss of reproduction data even when data to be reproduced are present in a plurality of areas.

It is still another object of the present invention to allow reduction of power consumption when data to be reproduced are present in a plurality of areas.

In order to achieve the above objects, according to an aspect of the present invention, there is provided a reproducing apparatus comprising:

reproduction means for reproducing a plurality of information data from a recording medium;

a memory for storing the information data reproduced by the reproduction means;

memory management means for controlling writing/reading the information data in/from the memory;

change means for changing a reproduction order designated by reproduction control data that indicates the reproduction order of the plurality of information data, in accordance with recording positions of the plurality of information data on the recording medium;

control means for controlling the reproduction means and the memory management means so as to reproduce the plurality of information data in accordance with the reproduction order changed by the change means and write the reproduced information data in the memory and to read out the plurality of information data from the memory in the order designated by the reproduction control data; and control data processing means for changing a content of the reproduction control data in accordance with the reproduction order changed by the change means.

The above and other objects, features, and advantages of the present invention will become apparent from the following description in conjunction with the accompanying drawings.

BRIEF DESCRIPTION OF THE DRAWINGS

FIG. 4 is a view showing the memory usage in the reproduction mode;

FIG. 5 is a view showing the memory usage in the reproduction mode;

FIG. 6 is a view showing a rewritten reproduction script; and

FIG. 7 is a flow chart for explaining reproduction script rewrite processing.

DETAILED DESCRIPTION OF THE PREFERRED EMBODIMENTS

The embodiment of the present invention will be described below.

Figure 1:
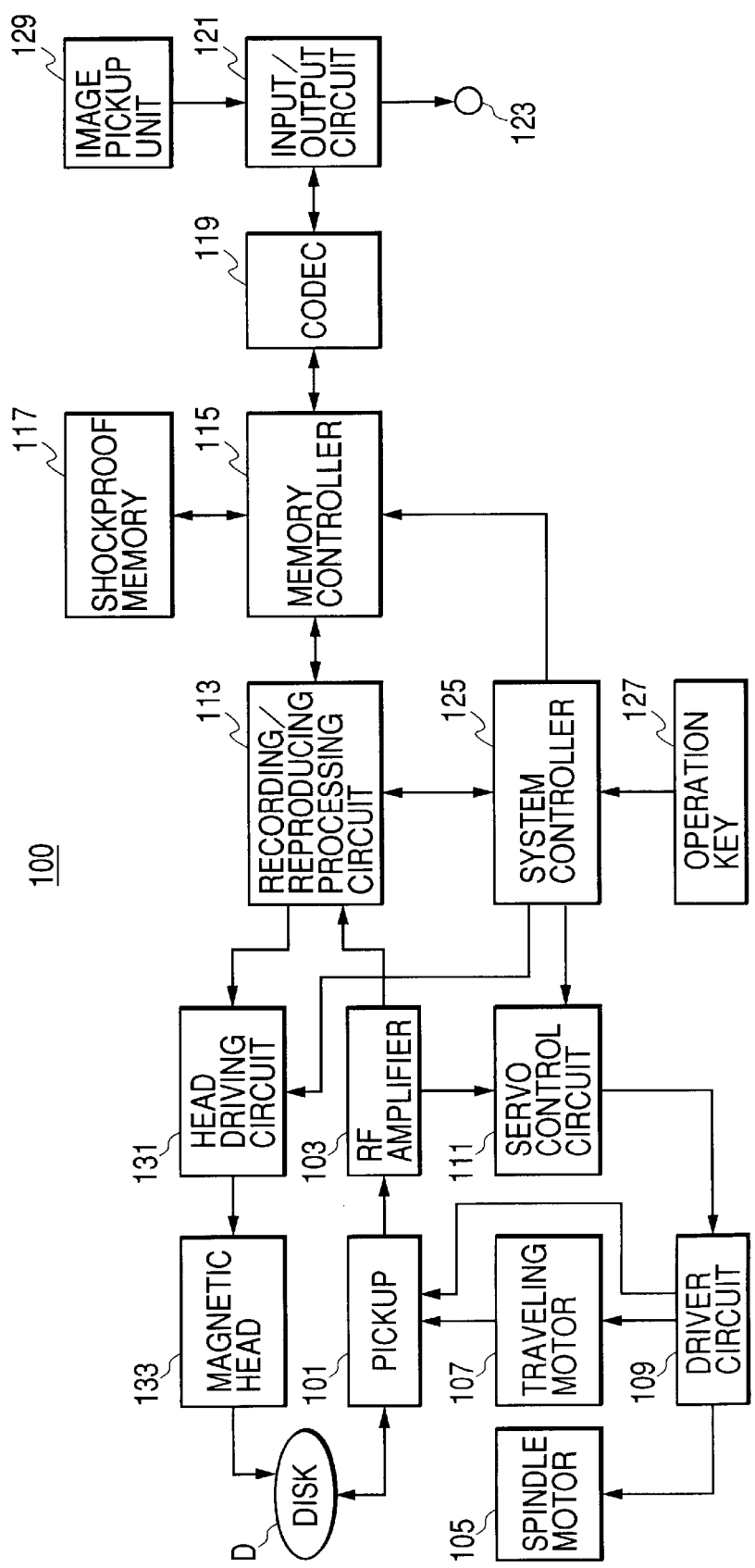
FIG. 1 is a block diagram showing the arrangement of a recording/reproducing apparatus to which the present invention is applied.

FIG. 1 is a block diagram showing the arrangement of a recording/reproducing apparatus to which the present invention is applied. The recording/reproducing apparatus of this embodiment encodes image data or audio data using a format of MPEG2 transport stream (to be referred to as MPEG2-TS) and records/reproduces the data on/from a magnetooptical disk.

Normal reproducing operation will be described first.

Referring to FIG. 1, a magnetooptical disk D is rotatably driven by a spindle motor 105 controlled by a driver circuit 109. A pickup 101 is moved in the radial direction of the disk D by a traveling motor 107 driven by the driver circuit 109. Data recorded on the disk D is read by the pickup 101. In this embodiment, the disk D is arranged in a cartridge and can easily be loaded into or unloaded from an apparatus 100 through a slot mechanism (not shown). The output from the pickup 101 is amplified by an RF amplifier and output to a recording/reproducing processing circuit 113.

An RF amplifier 103 generates a servo control signal on the basis of the reproduced data and outputs the signal to a servo control circuit 111. On the basis of the servo control signal from the RF amplifier and a control signal from a system controller 125, the servo control circuit 111 controls the pickup 101, spindle motor 105 and traveling motor 107.

The recording/reproducing processing circuit 113 demodulates the reproduced data to detect original digital data. The recording/reproducing processing circuit 113 also executes error correction processing and the like for the reproduced data and outputs the processed data to a memory controller 115. The recording/reproducing processing circuit 113 also detects, from the reproduced data, management information called TOC (Table Of Contents) recorded in a predetermined recording area, e.g., the innermost area on the disk D and outputs the detected information to the system controller 125.

In this embodiment, when the apparatus 100 is powered on or when the disk D is inserted, TOC data is read out and stored in a memory (not shown) in the system controller 125. The contents of the TOC are appropriately changed by the system controller 125 in accordance with the recording/reproducing operation and recorded again on the disk D when the disk D is unloaded.

The memory controller 115 writes the information data output from the recording/reproducing processing circuit 113 into a shockproof memory (to be referred to as a memory hereinafter) 117 in accordance with a control signal from the system controller 125. The memory controller 115 also reads out the information data from the memory 117 at a timing designated by the system controller 125 and outputs the read-out information data to a CODEC 119.

In this embodiment, image data and audio data recorded on the disk D are encoded according to a format complying with MPEG2-TS. The CODEC 119 decodes the data output from the memory controller 115 and outputs the decoded data to an input/output circuit 121. The input/output circuit 121 has a D/A converter to convert the image data and audio data decoded by the CODEC 119 into a format appropriate for an external device. The converted data is output to an output terminal 123.

Operation in the recording mode will be described next.

Image data obtained by an image pickup unit 129 is output to the input/output circuit 121. The input/output circuit 121 has an A/D converter to convert the image data from the image pickup unit 129 into digital data and outputs it to the CODEC 119.

The CODEC 119 encodes the image data output from the input/output circuit 121 according to a format complying with MPEG2-TS and outputs the encoded data to the memory controller 115. The memory controller 115 writes the image data output from the CODEC 119 into the memory 117. The memory controller 115 also reads out the data from the memory 117 at a timing designated by the system controller 125 and outputs the read-out data to the recording/reproducing processing circuit 113. In this embodiment, since the image data write rate in the disk D is higher than the data rate of the image data output from the CODEC 119, the rate difference is absorbed by using the memory 117.

The recording/reproducing processing circuit 113 executes error correction coding, digital modulation processing, and the like for the image data read out from the memory 117 and outputs the processed data to a head driving circuit 131. The head driving circuit 131 drives a magnetic head 133 in accordance with the recording data sequence from the recording/reproducing processing circuit to record the data onto the disk D. At this time, the system controller 125 determines the data recording position on the disk D on the basis of TOC that has been reproduced in advance.

An operation key 127 includes various kinds of keys such as a key for switching between recording/reproducing modes, a recording trigger key, and a reproduction key. In this embodiment, a data sequence recorded during a period from a recording start instruction to a recording end instruction provided by the operation key are recorded on the disk D as one file.

Reproduction script data in this embodiment will be described next.

A reproduction script is used to control reproducing processing of information data recorded on the disk D to generate new reproduced data. For example, only impressive scenes of moving image data recorded on the disk D are sequentially reproduced to create a digest. Instead of directly editing information data itself as an edit source, an editing result is recorded as a reproduction script, thereby shortening the recording time and reducing the storage capacity. When secondary use of data in a personal computer or the like is taken into consideration, the reproduction script is preferably versatile. For example, in this embodiment, SMIL2.0 (to be simply referred to as SMIL hereinafter) is used.

In this embodiment, reproduction script data is recorded on the disk D as an independent file separated from a file of information data such as image data or audio data. The reproduction script data is reproduced from the disk D and output from the recording/reproducing processing circuit 113 to the system controller 125. The system controller 125 stores the reproduced reproduction script data in an internal memory and controls reproducing processing using the stored reproduction script data in a way to be described below.

Next, the relationship between the use amount of the shockproof memory 117 and the seek time of each information data will be described.

Figures 2, 3:
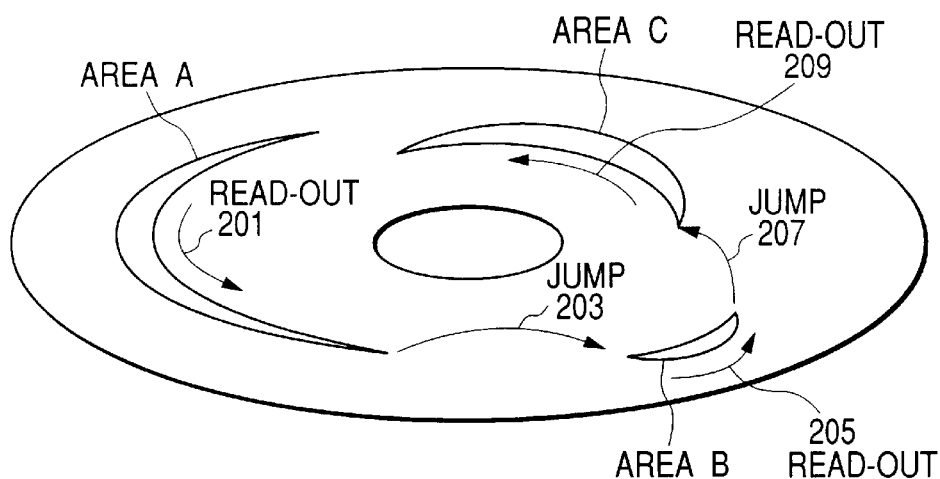
FIG. 2 is a view showing the reproducing operation of a disk.
FIG. 3 is a view showing reproduction script data.

For example, assume that three information data (files) are arranged on the disk D, as shown in FIG. 2. The three information data recorded on the disk D are denoted as data A, B and C. Areas where the data A, B and C are recorded are denoted as areas A, B and C, respectively.

To reproduce the data A, B and C in this order, the data are reproduced from the disk D by processes 201 to 209 shown in FIG. 2. FIG. 3 shows an example of the description of the reproduction script when the reproduction order is designated as shown in FIG. 2. In the SMIL, child elements of <body> element are designated to reproduce in the order of description.

When the data amount reproduced from the disk D for one second is twice that read out from the memory 117 in for one second, the amount of data stored in the memory 117 by the processes 201 to 209 is shown in FIG. 4.

At the portion 201, the data A is reproduced from the disk D while being read out from the memory 117. The amount of data stored in the memory 117 increases.

However, since no data can be reproduced from the disk D during the inter-area seek 203, the amount of data stored in the memory 117 decreases at a speed twice that of data stored in the memory 117 at the portion 201. At the portion 205, the amount of data stored in the memory 117 increases again. However, the memory 117 causes underflow due to the inter-area seek 207.

In this case, the start of reproduction of the data C is delayed. In the example shown in FIG. 4, it is assumed that no read error occurs during the data read from the disk D. If a data read error occurs, data read retry processing is executed. Hence, underflow of the memory 117 occurs at a higher probability.

FIG. 5 shows an example in which the data B is reproduced from the disk D and stored in the memory 117 in advance, and then reproduction is started in accordance with a reproduction script.

In this case, since the data is reproduced from the disk D in advance, inter-area seek occurs at the time of jump from the end of the area A to the start of the area C. This processing is denoted by 501.

When, of data designated by a reproduction script, data with a short reproduction time is reproduced from the disk D and stored in the memory 117 in advance, any underflow of the memory 117 can be avoided. The SMIL has a function of designating data which is preferably read out in advance is prepared. When <prefetch> element is used, data to be pre-fetched from the disk can be designated.

That is, when the reproduction order of data designated by the reproduction script is changed in consideration of the inter-area seek, and the timing at which the data is to be read out from the disk is designated in advance by <prefetch> element, the data can always be reproduced in an optimum order. For example, when the reproduction script is described as follows:

```
<body>
    <video src="sample1.mpg"/>
    <prefetch src="sample3.mpg"/>
    <video src="sample2.mpg"/>
    <video src="sample3.mpg"/>
</body>
``` sample3.mpg is read out from the disk, after sample1.mpg is read out from the disk to be reproduced (decoded). After sample3.mpg is read out from the disk, sample2.mpg is read out from the disk to be reproduced. In the SMIL, synchronous designation is also possible. By describing the reproduction script as follows:

```
<body>
    <par>
        <video src="sample1.mpg"/>
        <prefetch src="sample3.mpg"/>
    </par>
    <video src="sample2.mpg"/>
    <video src="sample3.mpg"/>
</body>
``` it is possible to pre-fetch allows pre-fetching sample3.mpg while reproducing sample1.mpg. FIG. 6 shows the description of the reproduction script for the case shown in FIG. 5.

In this embodiment, when information data recorded on the disk D is to be reproduced in accordance with reproduction script data reproduced from the disk D, the system controller 125 detects the recording position on the disk D of the information data designated by the reproduction script data, on the basis of a TOC that is read out from the disk D and stored in the internal memory in advance. On the basis of this recording position, the seek time between the storage areas of the respective information data designated by the reproduction script data is calculated, and the reproduction order of information data from the disk D is determined in consideration of the seek time, the capacity of the memory 117, and the reproduction time length of each information data designated by the reproduction script.

In this embodiment, the memory 117 has a capacity to store encoded image data for several sec to several ten sec.

Data reproduction order change processing by the system controller 125 will be described with reference to the flow chart in FIG. 7.

When reproduction with a reproduction script is instructed by the operation key 127, the system controller 125 confirms reproduction script data which is reproduced from the disk D and stored in the internal memory in advance (step S701) and checks whether <prefetch> element is included in the reproduction script (step S702).

If no <prefetch> element is included in the reproduction script, the data reproduction order may be inappropriate. Hence, as described above, the reproduction time length of each information data designated by the reproduction script and the seek time between storage areas are checked (step S703). On the basis of the check result, if the reproduction order is inappropriate, the reproduction order is determined such that a clip with a short reproduction time is reproduced in advance (step S704).

The content of the reproduction script data is changed in accordance with the determined reproduction order (step S705). In accordance with the determined reproduction order, each information data is reproduced from the disk D and written in the memory 117 (step S706). The information data are then read out from the memory 117 in the order designated by the reproduction script (step S707). After all data designated by the reproduction script are reproduced, the reproduction script data with the changed content is recorded on the disk D, and the processing is ended (step S708).

If it is determined in step S702 that <prefetch> element is included in the reproduction script, it is determined that the reproduction script data is already optimized, and thus data are reproduced from the disk D and written in the memory 117 in accordance with the reproduction script (step S709). Then, the data are read out for the memory 117 in accordance with the reproduction script, as described above.

The reproduction script changing procedure in step S705 and, more particularly, processing of determining data with a short reproduction time will be described next.

In this embodiment, in the above-described step S704, a clip with a short reproduction time is reproduced in advance. More specifically, a clip whose reproduction time is shorter than a predetermined time is read out in advance.

A method of determining the timing at which the thus selected clip with a short reproduction time should be read out from the disk will be described next.

For example, to determine the reproduction timing of the clip C, i.e., one of the thus selected clips with short reproduction times, first, a set S of clips to be reproduced before the clip C in the reproduction script is selected. Next, from the clips in the set S, a clip group Q which satisfies the following conditions:

(a) the reproduction time is longer than a predetermined reproduction time t, (b) designation of a read of the short clip does not follow immediately after, and (c) the reproduction time of a clip following immediately after is also longer than t is selected.

That is, in the condition (a), the reproduction time t is set to be slightly longer than, e.g., the worst value of inter-area seek of the recording/reproducing apparatus 100. When a clip with a short reproduction time is read out earlier immediately after a clip with a long reproduction time, any delay in seek can probably be prevented.

Next, the condition (b) is provided for the following reason. For a clip, immediately after which pre-fetch of another short clip is already set, if another pre-fetch of a shorter clip is added, a plurality of short clips are continuously designated to pre-fetch. This may cause a delay in seek.

Finally, the condition (c) is provided for the following reason. When pre-fetch of a short clip is executed between clips having a certain length, short clips are prevented from being continuously read out.

A clip whose reproduction is started last in the clip group Q is selected. A timing immediately after the selected clip is determined as the read timing of the clip C, and the reproduction script is rewritten accordingly. The read timings of the remaining short clips are determined in accordance with the same procedure as described above, thereby changing the reproduction script.

In this embodiment, all clips whose reproduction times are shorter than a predetermined time are pre-fetched. However, when the read timing is changed, the memory 117 may overflow, as described above, due to the problem of the capacity of the shockproof memory 117, or the like. In such case, pre-fetch is inhibited for that clip. Alternatively, the read timing of that clip may be changed to a timing immediately after another clip in the set S of clips, and a simulation may be done to check whether overflow of the memory occurs again.

As described above, according to this embodiment, the reproduction script is rewritten such that in a plurality of clips designated to reproduce by the reproduction script, a clip having a short reproduction time is read out from the disk and stored in the shockproof memory in advance. With this processing, even when reproduction is done in accordance with the reproduction scrip, any loss of reproduced image data can be prevented, and satisfactory reproduction can be realized.

Since the reproduction script data with the rewritten content is recorded on the disk, no optimization processing need be performed when the next reproduction is performed according to that reproduction script data.

In the above-described embodiment, the program data is described by the SMIL, though it may be described by the XML (eXtensible Markup Language), SGML (Standard Generalized Markup Language), or HTML (Hyper Text Markup Language).

In this embodiment, decoding processing and synthesis processing of video and audio data are realized by a hardware configuration, though it may be realized by software processing using a microcomputer.

In this case, the program codes of the software implement the function of the above-described embodiment by themselves. The program code themselves and a means for supplying the program codes to the computer, e.g., a storage medium that stores the program codes constitutes the present invention. As the storage medium for storing the program codes, for example, a floppy disk, hard disk, optical disk, magnetooptical disk, CD-ROM, magnetic tape, nonvolatile memory card, ROM, or the like can be used.

The function described in the above-described embodiment is implemented not only by causing the computer to execute the supplied program codes but also by cooperation of an OS (Operating System) running on the computer and another application software.

The functions of the above-described embodiment are also implemented when the supplied program codes are stored in the memory of a function expansion board of the computer or a function expansion unit connected to the computer, and the CPU of the function expansion board or function expansion unit performs some or all of actual processing operations on the basis of the instructions of the program codes.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus comprising:

reproduction means for reproducing a plurality of information data from a recording medium;

a memory for storing the information data reproduced by said reproduction means;

memory management means for controlling writing/reading of the information data in/from said memory;

change means for changing a reproduction order designated by reproduction control data that indicates the reproduction order of the plurality of information data, in accordance with recording positions of the plurality of information data on the recording medium;

control means for controlling said reproduction means and said memory management means so as to reproduce the plurality of information data in accordance with the reproduction order changed by said change means and write the reproduced information data in said memory and to read out the plurality of information data from said memory in the order designated by the reproduction control data; and control data processing means for changing a content of the reproduction control data in accordance with the reproduction order changed by said change means.

2. An apparatus according to claim 1, further comprising recording means for recording the reproduction control data changed by said control data processing means on the recording medium.

3. An apparatus according to claim 1, wherein said change means changes the reproduction order on the basis of reproduction time lengths of the information data designated by the reproduction control data.

4. An apparatus according to claim 1, wherein
the recording medium includes a disk-like recording medium, and
wherein said change means detects seek times for the plurality of information data by said reproduction means on the basis of the recording positions of the plurality of information data on the disk-like recording medium and changes the reproduction order on the basis of the detected seek times.

5. An apparatus according to claim 1, wherein said change means changes the reproduction order on the basis of a storage capacity of said memory.

6. An apparatus according to claim 1, wherein the reproduction control data is described by a data description language.

7. An apparatus according to claim 6, wherein said control data processing means adds a predetermined command to the reproduction control data in accordance with the changed reproduction order.

8. An apparatus according to claim 7, wherein said control data processing means adds a command which instructs to reproduce information data selected from the plurality of information data from the recording medium and write the reproduced information data in said memory, in accordance with the changed reproduction order.

9. An apparatus according to claim 6, wherein the data description language is SMIL.

10. An apparatus according to claim 1, wherein said memory also serves as a shockproof memory.

11. A reproducing apparatus comprising:
reproduction means for reproducing a plurality of information data and reproduction control data that designates a reproduction order of the plurality of information data, from a recording medium;
a memory for storing the information data reproduced by said reproduction means;
memory management means for controlling writing/reading of the information data in/from said memory;
determination means for determining the reproduction order of the plurality of information data in accordance with recording positions of the plurality of information data on the recording medium;
control means for controlling said reproduction means and said memory management means so as to reproduce the plurality of information data in accordance with the reproduction order determined by said determination means and write the reproduced information data in said memory and to read out the plurality of information data from said memory in the order designated by the reproduction control data; and
control data processing means for changing a content of the reproduction control data in accordance with the reproduction order determined by said determination means.

12. A reproducing apparatus comprising:
reproduction means for reproducing a plurality of information data and reproduction control data that designates a reproduction order of the plurality of information data, from a recording medium;
a memory for storing the information data reproduced by said reproduction means;
memory management means for controlling writing/reading of the information data in/from said memory;
change means for changing the reproduction order designated by the reproduction control data on the basis of a seek time between recording areas where the plurality of information data are recorded;
control means for controlling said reproduction means and said memory management means so as to reproduce the plurality of information data in accordance with the reproduction order changed by said change means and write the reproduced information data in said memory and to read out the plurality of information data from said memory in the order designated by the reproduction control data; and
control data processing means for changing a content of the reproduction control data in accordance with the reproduction order changed by said change means.

13. An apparatus according to claim 12, wherein said change means changes the reproduction order on the basis of reproduction time lengths of the information data designated by the reproduction control data.

14. A reproducing apparatus for reproducing a plurality of information data recorded on a recording medium in accordance with reproduction control data that indicates a reproduction procedure of the plurality of information data,
wherein a reproduction order of the plurality of information data is determined on the basis of the reproduction control data and a reproduction environment of said apparatus, the plurality of information data are reproduced from the recording medium by reproduction means in the determined reproduction order, and a content of the reproduction control data is changed by control data processing means in accordance with the determined reproduction order.

15. A reproducing apparatus for reproducing a plurality of information data recorded on a recording medium in accordance with reproduction control data that indicates a reproduction procedure of the plurality of information data,
wherein a reproduction order designated by the reproduction control data is changed in accordance with recording positions of the plurality of information data on the recording medium, the plurality of information data are reproduced in accordance with the changed reproduction order to be written in a memory, the plurality of information data are read out from the memory in the order designated by the reproduction control data, and a content of the reproduction control data is changed in accordance with the changed reproduction order.

16. A reproducing apparatus for reproducing a plurality of information data recorded on a recording medium in accordance with reproduction control data that indicates a reproduction procedure of the plurality of information data,
wherein a reproduction order designated by the reproduction control data is changed on the basis of a seek time between recording areas where the plurality of information data are recorded, the plurality of information data are reproduced in accordance with the changed reproduction order to be written in a memory, the plurality of information data are read out from the memory in the order designated by the reproduction control data, and a content of the reproduction control data is changed in accordance with the changed reproduction order.

17. A reproducing method comprising:
a reproduction step of reproducing a plurality of information data from a recording medium;
a storing step of storing the information data reproduced in said reproduction step in a memory;
a memory management step of controlling writing/reading of the information data in/from said memory;

a change step of changing a reproduction order designated by reproduction control data that indicates the reproduction order of the plurality of information data, in accordance with recording positions of the plurality of information data on the recording medium;

a control step of controlling said reproduction step and said memory management step so as to reproduce the plurality of information data in accordance with the reproduction order changed in said change step and write the reproduced information data in said memory and to read out the plurality of information data from said memory in the order designated by the reproduction control data; and a control data processing step of changing a content of the reproduction control data in accordance with the reproduction order changed in said change step.

18. A reproducing method comprising:

a reproduction step of reproducing a plurality of information data and reproduction control data that designates a reproduction order of the plurality of information data, from a recording medium;

a storing step of storing the information data reproduced in said reproduction step in a memory;

a memory management step of controlling writing/reading of the information data in/from said memory;

a determination step of determining the reproduction order of the plurality of information data in accordance with recording positions of the plurality of information data on the recording medium;

a control step of controlling said reproduction step and said memory management step so as to reproduce the plurality of information data in accordance with the reproduction order determined in said determination step and write the reproduced information data in said memory and to read out the plurality of information data from said memory in the order designated by the reproduction control data; and a control data processing step of changing a content of the reproduction control data in accordance with the reproduction order determined in said determination step.

19. A reproducing method comprising:

reproduction means for reproducing a plurality of information data and reproduction control data that designates a reproduction order of the plurality of information data, from a recording medium;

a storing step of storing the information data reproduced by said reproduction step in a memory;

a memory management step of controlling writing/reading of the information data in/from said memory;

a change step of changing the reproduction order designated by the reproduction control data on the basis of a seek time between recording areas where the plurality of information data are recorded;

a control step of controlling said reproduction step and said memory management step so as to reproduce the plurality of information data in accordance with the reproduction order changed in said change step and write the reproduced information data in said memory and to read out the plurality of information data from said memory in the order designated by the reproduction control data; and a control data processing step of changing a content of the reproduction control data in accordance with the reproduction order changed in said change step.

20. A reproducing method of reproducing a plurality of information data recorded on a recording medium in accordance with reproduction control data that indicates a reproduction procedure of the plurality of information data, comprising:

a determination step of determining a reproduction order of the plurality of information data on the basis of the reproduction control data and a reproduction environment of said apparatus, a reproduction step of reproducing the plurality of information data from the recording medium by reproduction means in the determined reproduction order, and a changing step of changing a content of the reproduction control data by control data processing means in accordance with the determined reproduction order.

21. A reproducing method of reproducing a plurality of information data recorded on a recording medium in accordance with reproduction control data that indicates a reproduction procedure of the plurality of information data, comprising:

a changing step of changing a reproduction order designated by the reproduction control data, in accordance with recording positions of the plurality of information data on the recording medium, a reproduction step of reproducing the plurality of information data in accordance with the changed reproduction order to be written in a memory, a read-out step of reading out the plurality of information data from the memory in the order designated by the reproduction control data, and a data changing step of changing a content of the reproduction control data in accordance with the changed reproduction order.

22. A reproducing method of reproducing a plurality of information data recorded on a recording medium in accordance with reproduction control data that indicates a reproduction procedure of the plurality of information data, comprising:

a changing step of changing a reproduction order designated by the reproduction control data, on the basis of a seek time between recording areas where the plurality of information data are recorded, a reproduction step of reproducing the plurality of information data in accordance with the changed reproduction order to be written in a memory, a read-out step of reading out the plurality of information data from the memory in the order designated by the reproduction control data, and a data changing step of changing a content of the reproduction control data in accordance with the changed reproduction order.

* * * * *